(12) United States Patent
Lan et al.

(10) Patent No.: US 10,993,379 B2
(45) Date of Patent: May 4, 2021

(54) LED PLANT LIGHT AND PLANT CULTIVATION SYSTEM USING SAME

(71) Applicant: Shenzhen Guanke Technologies Co., Ltd., Shenzhen (CN)

(72) Inventors: Qing Lan, Shenzhen (CN); Tianlong Dai, Shenzhen (CN); Ligen Liu, Shenzhen (CN); Shoubao Chen, Shenzhen (CN)

(73) Assignee: SHENZHEN GUANKE TECHNOLOGIES CO., LTD., Shenzhen (CN)

( * ) Notice: Subject to any disclaimer, the term of this patent is extended or adjusted under 35 U.S.C. 154(b) by 451 days.

(21) Appl. No.: 15/943,737

(22) Filed: Apr. 3, 2018

(65) Prior Publication Data

US 2019/0289791 A1    Sep. 26, 2019

(30) Foreign Application Priority Data

Mar. 20, 2018 (CN) .......................... 201810229242.6

(51) Int. Cl.
*A01G 7/04* (2006.01)
*A01G 9/20* (2006.01)
*F21V 21/22* (2006.01)
*F21V 21/26* (2006.01)
*A01G 9/24* (2006.01)

(52) U.S. Cl.
CPC .............. *A01G 7/045* (2013.01); *A01G 9/20* (2013.01); *A01G 9/249* (2019.05); *F21V 21/22* (2013.01); *F21V 21/26* (2013.01)

(58) Field of Classification Search
CPC .......... F21V 21/22; F21V 21/26; F21V 21/28; F21V 21/29; F21V 21/30
See application file for complete search history.

(56) References Cited

U.S. PATENT DOCUMENTS

| | | | | |
|---|---|---|---|---|
| 2,434,986 | A * | 1/1948 | Bremer | F21V 21/26 362/421 |
| 7,195,377 | B2 * | 3/2007 | Tsai | F16M 11/16 362/419 |
| 9,222,633 | B2 * | 12/2015 | Inskeep | F21S 9/02 |
| 2009/0086470 | A1 * | 4/2009 | Schafer | A01G 9/26 362/122 |
| 2009/0116210 | A1 * | 5/2009 | Cutler | H04N 5/23206 362/8 |
| 2013/0128565 | A1 * | 5/2013 | Cugini | F21L 4/02 362/184 |

(Continued)

*Primary Examiner* — Alexander K Garlen

(57) ABSTRACT

An LED plant light includes a light post, a light body and a rotating member. An elevation angle of the light body is adjusted by rotating the rotating member. The light post includes an adjustable member for adjusting the total length of the light post to adjust the height of the light body. The light body includes a first body portion, a second and third body portions respectively connected to the first body portion. The light angle of the light body can be changed by adjusting the angle between the first and second body portions or between the first and third body portions. The structure not only can meet the lighting use needs from seedling stage to growth stage, but also greatly improve the utilization efficiency of the LED plant light, minimize the planting time of plants to realize modular usage, simple the installation and maintenance and improve economic benefits.

8 Claims, 6 Drawing Sheets

(56) References Cited

U.S. PATENT DOCUMENTS

| | | | |
|---|---|---|---|
| 2013/0265780 A1* | 10/2013 | Choksi | F21V 17/08 |
| | | | 362/373 |
| 2016/0298831 A1* | 10/2016 | Fang | F21V 21/06 |
| 2018/0058673 A1* | 3/2018 | Fang | F21V 21/406 |
| 2018/0087755 A1* | 3/2018 | Yorio | A01G 9/249 |
| 2018/0149344 A1* | 5/2018 | Cornell | F16M 11/38 |
| 2018/0163957 A1* | 6/2018 | Zhou | F21V 21/22 |

* cited by examiner

LED PLANT LIGHT AND PLANT CULTIVATION SYSTEM USING SAME

BACKGROUND

1. Technical Field

The present disclosure generally relates to light sources field, and especially relates to a Light-Emitting Diode (LED) plant light and a plant cultivation system using same.

2. Description of Related Art

It is well known that the LED plant lights are widely used in artificial cultivations. Some different plants have different light needs for plant lamps, and even the need for light at different growth stages of the same plant is also different. However, the illumination intensity or the illumination angle of a conventional LED plant light is single, which can't meet the illumination requirement of the same plant in different growth stages. Thus, now, this problem is only solved by changing the plant growing environment.

An LED plant light and a plant cultivation system using same of the present disclosure are provided to meet the lighting use needs from the plant seedling stage to the plant growth stage. The plant cultivation system includes a seedling device, a cultivation device and the LED plant light, which not only can accordingly adjust the lighting height and the light angle of the LED plant light according to the gradual growth of plant seedlings, but also greatly improve the utilization efficiency of the LED plant light, minimize the planting time of plants to realize modular usage, simple the installation and maintenance and improve economic benefits.

SUMMARY

The disclosure relates to an LED plant light and a plant cultivation system using same which may accordingly adjust the lighting height and the light angle of the LED plant light according to the gradual growth of plant seedlings, and not only can meet the lighting use needs from the plant seedling stage to the plant growth stage, but also greatly improve the utilization efficiency of the LED plant light, minimize the planting time of plants to realize modular usage, simple the installation and maintenance and improve economic benefits.

In one aspect, an LED plant light includes: a light post, a light body and a rotating member rotatably connected between the light post and the light body. The light post includes an adjustable member for adjusting the total length of the light post along the up-and-down direction so as to adjust the height of the light body. The light body includes a first body portion, a second body portion and a third body portion symmetrically set on two opposite ends of the first body portion and respectively rotated relative to the first body portion. An elevation angle of the light body can be adjusted by rotating the rotating member according to the gradual growth of plant seedlings, and the light angle of the light body can be changed by adjusting the angle between the first body portion and the second body portion or the angle between the first body portion and the third body portion.

Wherein the adjustable member includes a plurality of retractable rods connected with together to produce a relative displacement between each other along the height direction of the adjustable member, a corresponding adjuster is formed on each retractable rod and one aperture of each retractable rod is gradually decreased along the direction from the bottom to the top thereof.

Wherein each of the first body portion, the second body portion and the third body portion correspondingly includes a plurality of cooling fins, a driver is formed on the middle of the plurality of cooling fins to control the light body turn on or turn off, and two pairs of rings are formed on the plurality of cooling fins disposed on the first body portion for hanging the LED plant light on other subjects.

Wherein the light body further includes a wiring pipe, with one end of the wiring pipe inserted into the driver to electrically connect with the driver, and the light post includes a receiving slot formed on one end thereof near the rotating member for receiving the other end of the wiring pipe therein.

Wherein the light body further includes a first rotatable shaft connected to the first body portion and the second body portion, and a second rotatable shaft connected to the first body portion and the third body portion, each of the first and second rotatable shafts includes a first connecting end fixed with the first body portion, a pair of second connecting ends and a pair of end covers; two opposite ends of the first connecting end respectively inserted into one portion of each second connecting end so as to the pair of second connecting ends rotate relative to the first connecting end, the pair of end covers respectively covering on the other corresponding portion of each second connecting end.

Wherein a first installing portion, a second installing portion and a third installing portion are respectively disposed on the plurality of cooling fins of the first body portion, the second installing portion and the third installing portion respectively and symmetrically set on two opposite ends of the first installing portion; the first installing portion includes a first connector defining a first wiring portion and a second wiring portion perpendicular to the first wiring portion and electrically connected to the driver, the second installing portion including a second connector perpendicular to the first rotatable shaft, the third installing portion including a third connector perpendicular to the second rotatable shaft, both the second connector and the third connector electrically connected to the first wiring portion.

Wherein the rotating member includes a first fixing end tightly connected to the light body, a second fixing end connected between the first fixing end and the light post, and a fixing shaft passing through the first fixing end and the second fixing end.

Wherein the rotating member further includes an adjusting portion connected to the first fixing end and the second fixing end, the adjusting portion including an adjusting handle and an adjusting end tightly fixed with the adjusting handle, the second fixing end defining a gear and a gear hole therein and the adjusting end including a block received between the gear and the gear hole to mesh with the gear racks of the gear and the gear hole.

Wherein the light body is roughly curved quadrilateral configuration, and the second body portion and the third body portion are respectively inclined a same angle relative to the first body portion.

In another aspect, a plant cultivation system according to an exemplary embodiment of the present disclosure includes a seedling device, a cultivation device for receiving the seedling device therein, and an LED plant light connected to the seedling device and the cultivation device. The cultivation device defines an installing hole at a side thereof and the LED plant light is inserted into the installing hole so as to the LED plant light dispose above the cultivation device. The LED plant light includes a light post, a light body and a rotating member rotatably connected between the light post and the light body. The light post includes an adjustable member for adjusting the total length of the light post along the up-and-down direction so as to adjust the height of the light body. The light body includes a first body portion, a second body portion and a third body portion symmetrically set on two opposite ends of the first body portion and respectively rotated relative to the first body portion. An elevation angle of the light body can be adjusted by rotating the rotating member according to the gradual growth of plant seedlings, and the light angle of the light body can be changed by adjusting the angle between the first body portion and the second body portion or the angle between the f first body portion and the third body portion.

Wherein the seedling device includes a plurality of seedling units formed thereon, both the plurality of seedling units and the cultivation device include at least one outlet thereon.

Wherein the cultivation device is a hollow rectangular structure and includes a bottom plate, a first sidewall and a second sidewall respectively and perpendicularly connected to two opposite ends of the bottom plate, with the first sidewall opposite to the second sidewall, a pair of third sidewalls respectively and perpendicularly connected to the other two opposite ends of the bottom plate, and a receiving room surrounded by the bottom plate, the first, second and third sidewalls for receiving the seedling device therein; each protrusion protruding towards the receiving room from the corresponding middle portion of the first and second sidewalls, the outlet formed on the middle of the bottom plate, and the installing hole extending downward from the upper end of the protrusion disposed on the first sidewall along a direction parallel to the first sidewall.

Wherein the adjustable member includes a plurality of retractable rods connected with together to produce a relative displacement between each other along the height direction of the adjustable member, a corresponding adjuster is formed on each retractable rod and one aperture of each retractable rod is gradually decreased along the direction from the bottom to the top thereof.

Wherein each of the first body portion, the second body portion and the third body portion correspondingly includes a plurality of cooling fins, a driver is formed on the middle of the plurality of cooling fins to control the light body turn on or turn off, and two pair of rings are formed on the plurality of cooling fins disposed on the first body portion for hanging the LED plant light on other subjects.

Wherein the light body further includes a wiring pipe, with one end of the wiring pipe inserted into the driver to electrically connect with the driver, and the light post includes a receiving slot formed on one end thereof near the rotating member for receiving the other cod of the wiring pipe therein.

Wherein the light body further includes a first rotatable shaft connected to the first body portion and the second body portion, and a second rotatable shaft connected to the first body portion and the third body portion, each of the first and second rotatable shafts includes a first connecting end fixed with the first body portion, a pair of second connecting ends and a pair of end covers; two opposite ends of the first connecting end respectively inserted into one portion of each second connecting end so as to the pair of second connecting ends rotate relative to the first connecting end, the pair of end covers respectively covering on the other corresponding portion of each second connecting end.

Wherein a first installing portion, a second installing portion and a third installing portion are respectively disposed on the plurality of cooling fins of the first body portion, the second installing portion and the third installing portion respectively and symmetrically set on two opposite ends of the first installing portion; the first installing portion includes a first connector defining a first wiring portion and a second wiring portion perpendicular to the first wiring portion and electrically connected to the driver, the second installing portion including a second connector perpendicular to the first rotatable shaft, the third installing portion including a third connector perpendicular to the second rotatable shaft, both the second connector and the third connector electrically connected to the first wiring portion.

Wherein the rotating member includes a first fixing end tightly connected to the light body, a second fixing end connected between the first fixing end and the light post, and a fixing shaft passing through the first fixing end and the second fixing end.

Wherein the rotating member further includes an adjusting portion connected to the first fixing end and the second fixing end, the adjusting portion including an adjusting handle and an adjusting end tightly fixed with the adjusting handle, the second fixing end defining a gear and a gear hole therein and the adjusting end including a block received between the gear and the gear hole to mesh with the gear racks of the gear and the gear hole.

Wherein the light body is roughly curved quadrilateral configuration, and the second body portion and the third body portion respectively are inclined a same angle relative to the first body portion.

The present disclosure provides the advantages as below.

The LED plant light and the plant cultivation system using same of the present disclosure are provided to meet the lighting use needs from the plant seedling stage to the plant growth stage. The plant cultivation system includes a seedling device, a cultivation device and the LED plant light, which not only can accordingly adjust the lighting height and the light angle of the LED plant light according to the gradual growth of plant seedlings, but also greatly improve the utilization efficiency of the LED plant light, minimize the planting time of plants to realize modular usage, simple the installation and maintenance and improve economic benefits.

DETAILED DESCRIPTION

Figure 1:
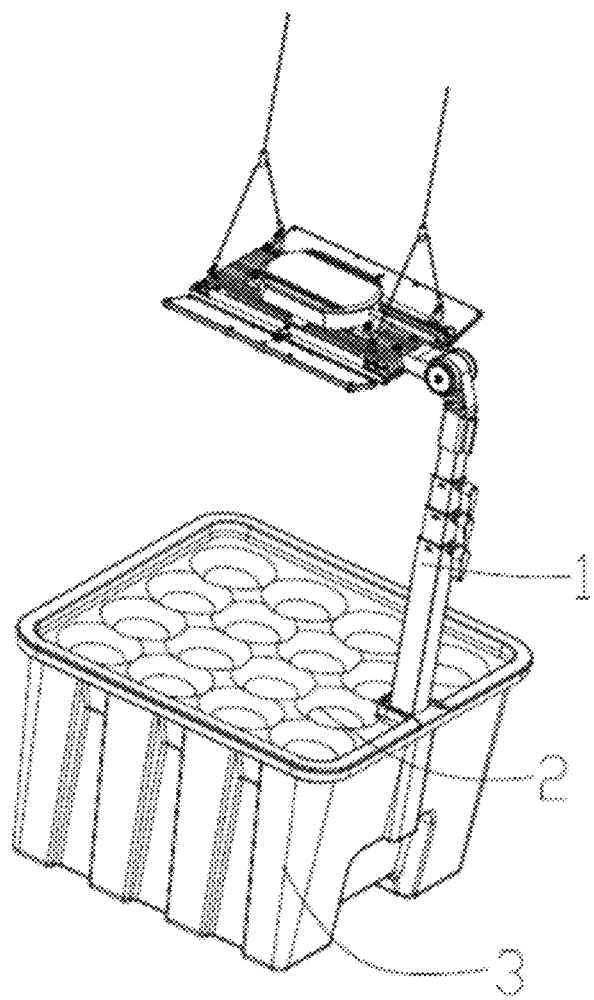
FIG. 1 is a schematic view of the plant cultivation system in accordance with an exemplary embodiment.

The disclosure is illustrated by way of example and not by way of limitation in the figures of the accompanying drawings, in which like reference numerals indicate similar elements.

Figure 2:
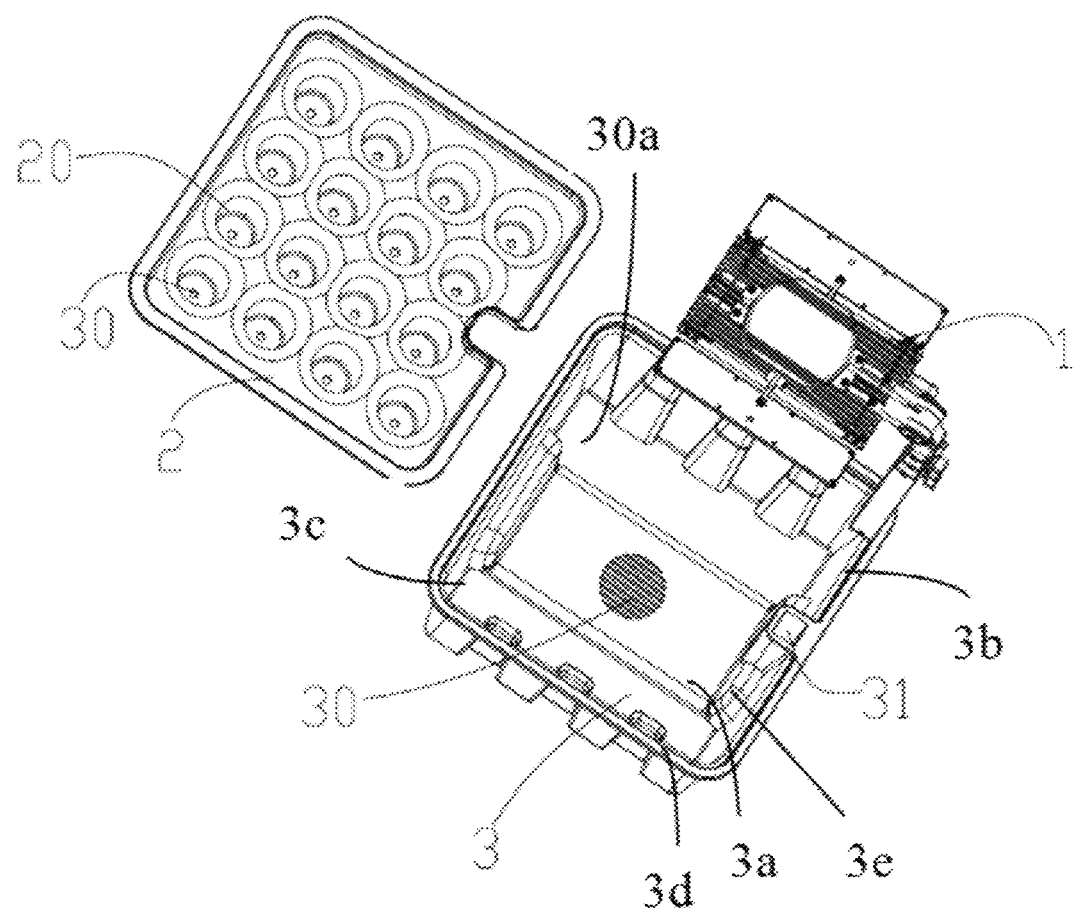
FIG. 2 is an exploded, schematic view of the plant cultivation system of FIG. 1.
Figure 3:
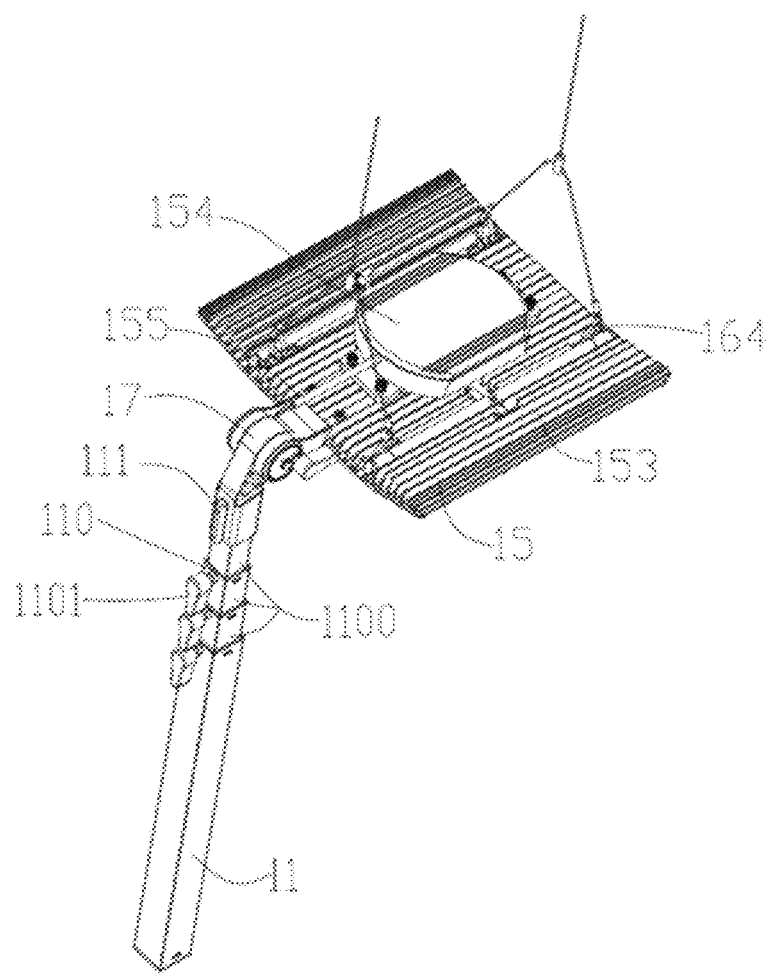
FIG. 3 is a schematic view of the LED light of FIG. 1.

Referring to FIGS. 1-3, the plant cultivation system according to an exemplary embodiment includes a seedling device 2, a cultivation device 3 for receiving the seedling device 2 therein, and an LED plant light 1 connected to the seedling device 2 and the cultivation device 3. The cultivation device 3 defines an installing hole 31 at a side thereof, and the LED plant light 1 includes a light post 11 tightly inserted into the installing hole 31 so that the LED plant light 1 is disposed above the cultivation device 3. The seedling device 2 includes a plurality of seedling units 20 formed thereon, both the plurality of seedling units 20 and the cultivation device 3 include at least one outlet 30 thereon.

In the exemplary embodiment of the present disclosure, the cultivation device 3 is a hollow rectangular structure and includes a bottom plate 3a, a first sidewall 3b and a second sidewall 3c respectively and perpendicularly connected to two opposite ends of the bottom plate 3a, with the first sidewall 3a opposite to the second sidewall 3b, a pair of third sidewalls 3d respectively and perpendicularly connected to the other two opposite ends of the bottom plate 3a, and a receiving room 30 surrounded by the bottom plate 3a, the first sidewall 3a, the second sidewall 3b and the pair of third sidewalls 3d for receiving the seedling device 2 therein. Each protrusion 3e is protruded towards the receiving room 30a from the corresponding middle portion of the first and second sidewalls 3a, 3b. The outlet 30 is formed on the middle of the bottom plate 3a, and the installing hole 31 is extended downward from the upper end of the protrusion 3e disposed on the first sidewall 3a along a direction parallel to the first sidewall 3a.

In the exemplary embodiment of the present disclosure, according to the incubation object, the seedling device 2 can be chosen to whether is nested in the cultivation device 3. When the seedling is cultivated, the seedling device 2 is chosen to be nested in the cultivation device 3. At this time, the seedling device 2 is supported by the cultivation device 3, the cultivation medium, such as the soil, is placed in the plurality of seedling units 20, and the LED plant light 1 positioned above provides illumination light for the seedlings. When a larger plant is cultivated, the seedling device 2 is removed from the cultivation device 3. At this time, the cultivation medium, such as the soil, is placed in the cultivation device 3, and the LED plant light 1 positioned above provides illumination light for the plant in the cultivation device 3. The outlet 30 is used to discharge excess water in the medium (such as the soil).

In the exemplary embodiment of the present disclosure, the seedling device 2, the cultivation device 3 and the LED plant light 1 can be quickly installed and assembled together, which can greatly improve the utilization efficiency of the LED plant light 1, minimize the planting time of plants to realize modular usage, simple the installation and maintenance and improve economic benefits.

Referring to FIG. 3, the LED plant light 1 further includes a light body 15 and a rotating member 17 rotatably connected between the light post 11 and the light body 15. The light post 11 includes an adjustable member 110 for adjusting the total length of the light post 11 along the up-and-down direction so as to adjust the height of the light body 15. The light body 15 includes a first body portion 150, a second body portion 151 and a third body portion 152. The second body portion 151 and the third body portion 152 are symmetrically set on two opposite ends of the first body portion 150 and respectively rotated relative to the first body portion 150. An elevation angle of the light body 15 can be adjusted by rotating the rotating member 17 according to the gradual growth of plant seedlings, and the light angle of the light body 15 can be changed by adjusting the angle between the first body portion 150 and the second body portion 151 or the angle between the first body portion 150 and the third body portion 152.

In the exemplary embodiment of the present disclosure, the light body 15 is roughly curved quadrilateral configuration, and the second body portion 151 and the third body portion 152 are respectively inclined a same angle relative to the first body portion 150. At the same time, the light body 15 may not only include the second body portion 151 and the third body portion 152, but also include a plurality of modules consisted thereof.

In the exemplary embodiment of the present disclosure, as the growth stage or the plant height of the plants in the seedling device 2 or in the cultivation device 3 reaches different, by adjusting the elevation angle of the light body 15, the height between the light body 15 and the cultivation device 3, and the luminescence angle of the light body 15, which not only can meet the needs of the lighting of plants from the seedling stage to the growth stage, but also can greatly improve the utilization efficiency of the LED plant light 1 and save the plant to cultivation time.

Figure 4:
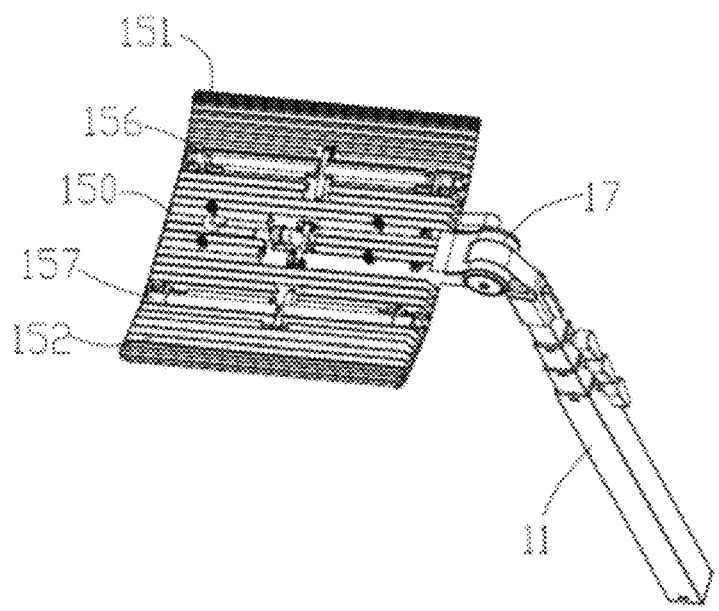
FIG. 4 is a partial schematic view of the LED light of FIG. 1 from another side.
Figure 5:
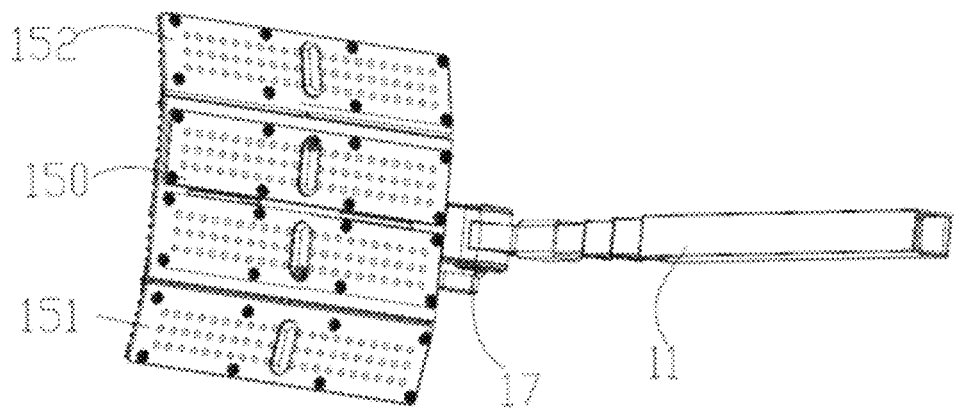
FIG. 5 is similar to FIG. 4, but shown the LED light from another side.

Furthermore, referring to FIGS. 3-5, the adjustable member 110 includes a plurality of retractable rods 1100 connected with together to produce a relative displacement between each other along the height direction of the adjustable member 110. A corresponding adjuster 1101 is formed on each retractable rod 1100 and an aperture of each retractable rod 1101 is gradually decreased along the direction from the bottom to the top thereof.

In the exemplary embodiment of the present disclosure, the adjustable member 110 includes four retractable rods 1100 embedded with each other and moved to each other along the height direction of the adjustable member 110. The three retractable rods 1100 each include a corresponding adjuster 1101. When it is necessary to adjust the length of the light post 11 to realize adjusting the height of the light body 15, one adjuster 1101 is loosened and then one retractable rod 1100 is manually stretched. Finally, a proper height is selected and then the adjuster 1101 is tightened, the position of the retractable rod 1100 can be fixed so that the retractable rod 1100 can't automatically slide down due to its gravity.

In the exemplary embodiment of the present disclosure, the number of the retractable rod 1100 is multiple, and the number of the retractable rods 1100 can be set according to the height of the cultivation plant. The cross-sectional of the retractable rod 1100 is square. It can be understood that the retractable rod 1100 can be other shapes in other exemplary embodiments.

Figure 6:
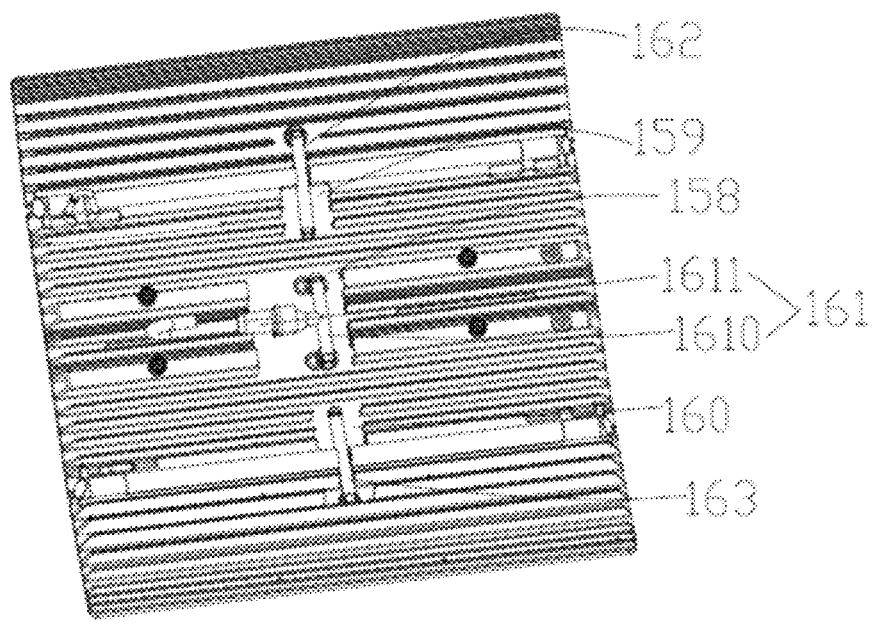
FIG. 6 is a schematic view of a light body of the LED light of FIG. 1.

Furthermore, referring to FIGS. 3-4 and FIG. 6, each of the first body portion 150, the second body portion 151 and the third body portion 152 correspondingly includes a plurality of cooling fins 153. A driver 154 is formed on the middle of the plurality of cooling fins 153 to control the light body 15 turn on or turn off, and two pairs of rings 164 are formed on the plurality of cooling fins 153 disposed on the first body portion 150 for hanging the LED plant light 1 on other subjects.

In the exemplary embodiment of the present disclosure, the cooling fin 153 is an inner-hollow mounting tube (not shown). The driver 154 is fixed with the mounting tube by screws so as to position the driver 154 on the cooling fin 153. In this way, the cooling fin 153 can dissipate heat of the driver 154 to improve the lifespan of the driver 154. In addition, a case (not shown) is provided to cover around the driver 154 for protection against water into the driver 154.

In the exemplary embodiment of the present disclosure, the two pairs of rings 164 are formed on the plurality of cooling fins 153 disposed on the first body portion 150 for hanging the LED plant light 1 on other subjects. In this way, the light body 15 can be hoisted and used without supporting by the light post 11, thereby the application scope of the light body 15 can be expanded.

Furthermore, the light body 15 further includes a wiring pipe 155, with one end of the wiring pipe 155 inserted into the driver 154 to electrically connect with the driver 154. The light post 11 includes a receiving slot 111 formed on one end thereof near the rotating member 17 for receiving the other end of the wiring pipe 155 therein.

In the exemplary embodiment of the present disclosure, the wiring pipe 155 is connected to an external power supply. The receiving slot 111 is formed on the end thereof near the rotating member 17 for tightly receiving the other end of the wiring pipe 155 therein. In this way, it can avoid the wiring pipe 155 formed in a jumble and improve the aesthetics of the LED plant light 1 and the plant cultivation system.

Furthermore, referring to FIGS. 3-6, the light body 15 further includes a first rotatable shaft 156 connected to the first body portion 150 and the second body portion 151, and a second rotatable shaft 157 connected to the first body portion 150 and the third body portion 152. Each of the first and second rotatable shafts 156, 157 includes a first connecting end 1570 fixed with the first body portion 150, a pair of second connecting ends 1571 and a pair of end covers 1572. Two opposite ends of the first connecting end 1570 are respectively inserted into the corresponding portion of each second connecting end 1571 so as to the pair of second connecting ends 1571 rotate relative to the first connecting end 1570, the pair of end covers 1572 is respectively covered on the other corresponding portion of each second connecting end 1571.

Referring to FIG. 5, in the exemplary embodiment of the present disclosure, each of the first body portion 150, the second body portion 151 and the third body portion 152 includes the corresponding lenses, aluminum plates, light beads, waterproof loops, fixed screws and other components.

In the exemplary embodiment of the present disclosure, the structure of the first rotatable shaft 156 is same as that of the second rotatable shaft 157, with a damping effective rotation. Each of the first and second rotatable shafts 156, 157 has the first connecting end 1570, the second connecting end 1571 and the end cover 1572. At the end of the first connecting end 1570 is further provided with a damping rotatable shaft 1570*a*, and a hexagonal step is provided on the damping rotatable shaft 1570*a* to limit the damping rotatable shaft 1570*a* so as to prevent the damping rotatable shaft 1570*a* from running out during the rotation. The second connecting end 1571 is a hollow tube to engage with the damping rotatable shaft 1570*a*. One end of the end cover 1572 is inclined and the other end of the end cover 1572 is flush with the end face of the second connecting end 1571 to prevent an offset along the axial direction of the first rotatable shaft 1570 or the second rotatable shaft 1571 during rotation. The second body portion 151 can rotate relative to the first body portion 150 by manual operation. When the external force by manual operation is removed, the second body portion 151 is ceased to rotate, and the second body portion 151 can't automatically droop due to the effect of gravity. In this way, the light body 15 forms a new lighting angle so as to achieve adjusting the light angle of the light body 15.

In the exemplary embodiment of the present disclosure, the first rotatable shaft 156 and the second rotatable shaft 157 each includes a damping shaft hole (not labeled) with other types of polygonal holes in addition to the positive hexagon hole.

Figure 7:
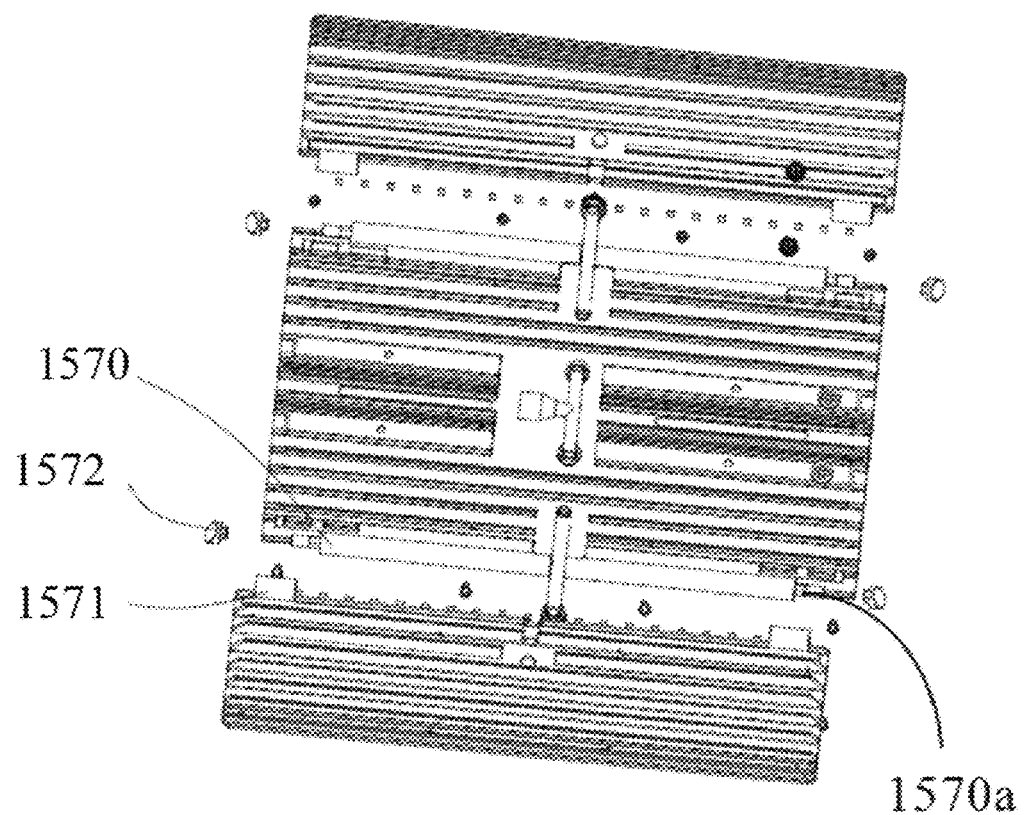
FIG. 7 is an exploded, schematic view of the light body of the LED light of FIG. 1.

Furthermore, referring to FIGS. 6-7, a first installing portion 158, a second installing portion 159 and a third installing portion 160 are respectively disposed on the plurality of cooling fins 153 of the first body 150. The second installing portion 159 and the third installing portion 160 are respectively and symmetrically set on two opposite ends of the first installing portion 158. The first installing portion 158 includes a first connector 161 defining a first wiring portion 1610 and a second wiring portion 1611 perpendicular to the first wiring portion 1610 and electrically connected to the driver 154. The second installing portion 159 includes a second connector 162 perpendicular to the first rotatable shaft 156, and the third installing portion 160 includes a third connector 163 perpendicular to the second rotatable shaft 157. Each of the second and third connectors 162, 163 is electrically connected to the first wiring portion 1610.

In the exemplary embodiment of the present disclosure, the second installing portion 159 and the third installing portion 160 are respectively and symmetrically arranged at two opposite ends of the first installing portion 158. Each outer layer of the first, second and third connectors 161, 162, 163 is covered with a waterproof case (not shown) for waterproof insulation. The second wiring portion 1611 rotates 180 degree to electrically connect to the driver 154, and the second connector 162 and the third connector 163 are respectively and electrically connected to two opposite ends of the first wiring portion 1610. The second connector 162 is perpendicular to the first rotatable shaft 156 to divide the first rotatable shaft 156 into two parts, while the third connector 163 is perpendicular to the second rotatable shaft 157 to divide the second rotatable shaft 157 into two parts. In this way, the electrical connection between the first body portion 150 and the second body portion 151 and between the first body portion 150 and the third body portion 152 is obtained by the mentioned above row design. At the same time, the rotation between the first body portion 150 and the second body portion 151 and the rotation between the first body portion 150 and the third body portion 152 can't be affected.

Figure 8:
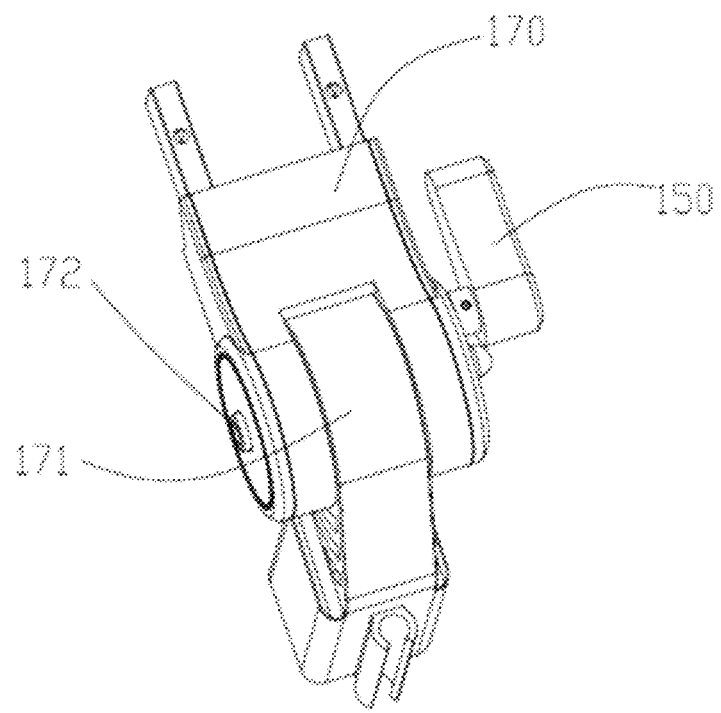
FIG. 8 is a schematic view of a rotating member of the LED light of FIG. 1.
Figure 9:
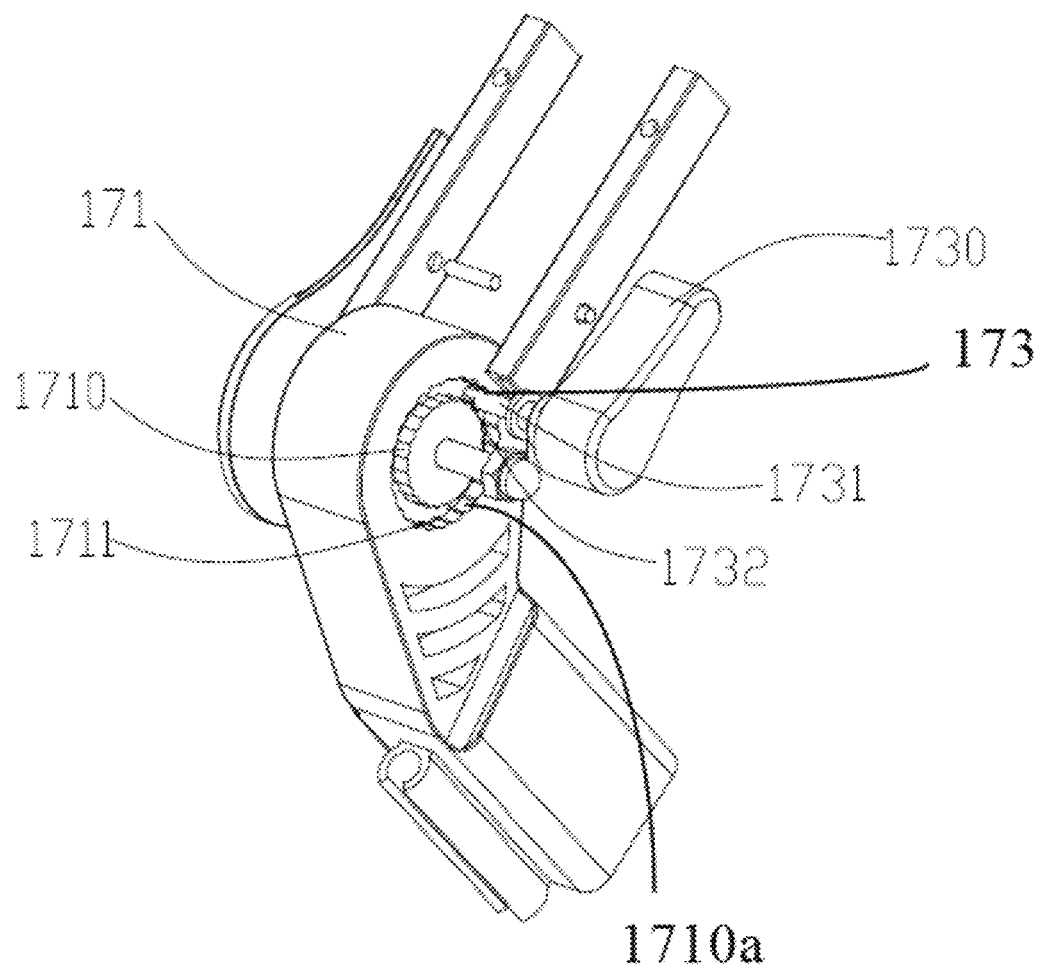
FIG. 9 is a partial exploded, schematic view of the rotating member of the LED light of FIG. 1.

Furthermore, referring to FIG. 8 and FIG. 9, the rotating member 17 includes a first fixing end 170 tightly connected to the light body 15, a second fixing end 171 connected between the first fixing end 170 and the light post 11, and a fixing shaft 172 passing through the first fixing end 170 and the second fixing end 171.

Furthermore, the rotating member 17 further includes an adjusting portion 173 connected to the first fixing end 170 and the second fixing end 171. The adjusting portion 173 includes an adjusting handle 1730 and an adjusting end 1731 tightly fixed with the adjusting handle 1730. The second fixing end 171 defines a gear 1710 and a gear hole 1711 formed thereon and the adjusting end 1731 includes a block 1732 received between the gear 1710 and the gear hole 1711 to mesh with gear racks 1710*a* of the gear 1710 and the gear hole 1711.

In the exemplary embodiment of the present disclosure, the fixing shaft 172 passes through the first fixing end 170 and the second fixing end 171 so that the first fixing end 170 can rotate relative to the second fixing end 171. The first fixing end 170 and the light body 15 are fixed with each other by screws, and the second fixing cod 171 is tightly fixed with the light post 11 by welding.

In the exemplary embodiment of the present disclosure, the fixing shaft 172 passes through the gear 1710. The configuration of the block 1732 is matched with that of the gear 1710 and the gear hole 1711 so as to limit the position of the adjusting portion 173 relative to the second fixing end 171. When it is necessary to adjust the elevation angle of light body 15, the adjusting handle 1730 is manually held down and then the adjusting portion 173 is loosened. At this time, the light body 15 is manually rotated to adjust the elevation angle of the light body 15. Finally, the adjusting portion 173 is tightened to fix the position of the light body 15.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. An LED plant light comprising: a light post, a light body and a rotating member rotatably connected between the light post and the light body, the light post comprising an adjustable member for adjusting the total length of the light post along the up-and-down direction so as to adjust the height of the light body, the light body comprising a first body portion, a second body portion and a third body portion symmetrically set on two opposite ends of the first body portion and respectively rotated relative to the first body portion; and wherein an elevation angle of the light body can be adjusted by rotating the rotating member according to the gradual growth of plant seedlings, and the light angle of the light body can be changed by adjusting the angle between the first body portion and the second body portion or the angle between the first body portion and the third body portion;

wherein each of the first body portion, the second body portion and the third body portion correspondingly comprises a plurality of cooling fins, a driver is formed on the middle of the plurality of cooling fins to control the light body to turn on or turn off, and two pair of rings are formed on the plurality of cooling fins disposed on the first body portion for hanging the LED plant light.

2. The LED plant light as claimed in claim 1, wherein the adjustable member comprises a plurality of retractable rods connected together to produce a relative displacement between each other along the height direction of the adjustable member, a corresponding adjuster is formed on each retractable rod and one aperture of each retractable rod is gradually decreased along the direction from the bottom to the top thereof.

3. The LED plant light as claimed in claim 1, wherein the light body further comprises a wiring pipe, with one end of the wiring pipe inserted into the driver to electrical connect with the driver, and the light post comprises a receiving slot formed an end thereof near the rotating member the rotating member for receiving the other end of the wiring pipe therein.

4. The LED plant light as claimed in claim 1, wherein the light body further comprises a first rotatable shaft connected to the first body portion and the second body portion, and a second rotatable shaft connected to the first body portion and the third body portion, each of the first and second rotatable shafts comprises a first connecting end fixed with the first body portion, a pair of second connecting ends and a pair of end covers; two opposite ends of the first connecting end respectively inserted into one portion of each second connecting end so as to the pair of second connecting ends rotate relative to the first connecting end, the pair of end covers respectively covering the other corresponding portion of each second connecting end.

5. The LED plant light as claimed in claim 1, wherein a first installing portion, a second installing portion and a third installing portion are respectively disposed on the plurality of cooling fins of the first body portion, the second installing portion and the third installing portion respectively and symmetrically set on two opposite ends of the first installing portion; the first installing portion comprises a first connector defining a first wiring portion and a second wiring portion perpendicular to the first wiring portion and electrically connected to the driver, the second installing portion comprising a second connector perpendicular to the first rotatable shaft, the third installing portion comprising a third connector perpendicular to the second rotatable shaft, both the second connector and the third connector electrically connected to the first wiring portion.

6. The LED plant light as claimed in claim 1, wherein the rotating member comprises a first fixing end tightly connected to the light body, a second fixing end connected between the first fixing end and the light post, and a fixing shaft passing through the first fixing end and the second fixing end.

7. The LED plant light as claimed in claim 6, wherein the rotating member further comprises an adjusting portion connected to the first fixing end and the second fixing end, the adjusting portion comprising an adjusting handle and an adjusting end tightly fixed with the adjusting handle, the second fixing end defining a gear and a gear hole therein and the adjusting end comprising a block received between the gear and the gear hole to mesh with gear racks of the gear and the gear hole.

8. The LED plant light as claimed in claim 6, wherein the light body is in a roughly curved quadrilateral configuration, and the second body portion and the third body portion are respectively inclined a same angle relative to the first body portion.

* * * * *